April 3, 1962 — C. C. CARLISLE — 3,027,766
INSTRUMENT FOR LOCATING SUBSURFACE DOMES
Filed July 17, 1958 — 2 Sheets-Sheet 1

INVENTOR.
Charles C. Carlisle.
BY
Paul E. Mullendore
ATTORNEY

April 3, 1962 C. C. CARLISLE 3,027,766
INSTRUMENT FOR LOCATING SUBSURFACE DOMES
Filed July 17, 1958 2 Sheets-Sheet 2
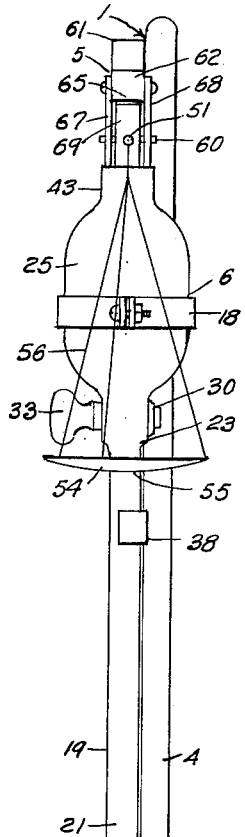
Fig. 2.
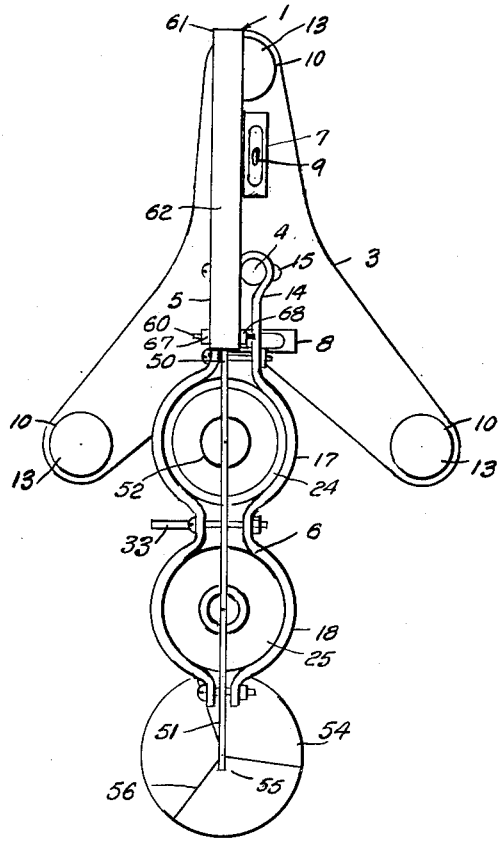
Fig. 3.
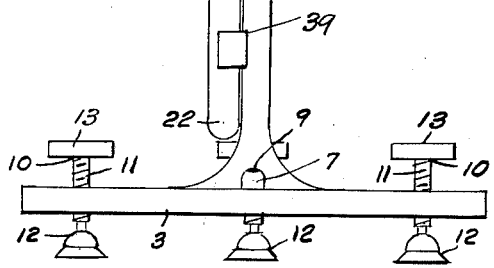
INVENTOR.
Charles C. Carlisle.
BY
Paul E Mullendore
ATTORNEY

United States Patent Office 3,027,766
Patented Apr. 3, 1962

3,027,766
INSTRUMENT FOR LOCATING SUBSURFACE DOMES
Charles C. Carlisle, 2851 E. 21st Place, Tulsa, Okla.
Filed July 17, 1958, Ser. No. 749,138
6 Claims. (Cl. 73—382)

This invention relates to an instrument for locating subsurface formations from locations on or above the earth's surface, and particularly to determine the possible presence of various minerals, petroleum and other valuable substances.

For example, petroleum, sulfur and other valuable minerals are entrapped in subsurface domes, usually caused by an uplift of igneous rocks, which are heavier in mass than the overlying formations. It is known that such heavier masses attract lighter masses with a force directly proportional to their mass and inversely proportional to the square of the distance between them. Consequently, the nearer an object is to the heavier formations, such as salt domes, igneous rocks and heavier minerals, the greater is the attraction of gravity on such object.

It is, therefore, the principal object of the present invention to provide an instrument for detecting the presence of concealed domes that may contain petroleum, sulfur and other valuable minerals by testing the force of gravity at different points over a likely area until a spot is found where the force of gravity is the greatest, and thereby locate a concealed dome which would be directly under such spot which is thus located.

A further object of the invention is to provide an instrument for sensing exceptionally small variations in the force of gravity acting upon an object, and by which the minute forces may be amplified so that they are easily noted and recorded.

Since very minute pressures or stresses can best be amplified by means of a differential manometer, and since variation in a force can best be determined by a type of dynamometer, the invention also relates to a method for dynamometrically measuring the gravitational attraction of subsurface formations on a movable object and to manometrically amplify the resultant gravitational effect on such object, and to a portable instrument combining the functions of a manometer and a dynamometer, whereby extremely minute variations in the effects of gravity on a known body or weight may be accurately indicated at different locations of the instrument.

In accomplishing these and other objects of the invention as hereinafter described, I have provided a new method and an instrument for practicing the method, which instrument is illustrated in the accompanying drawings, wherein:

FIG. 2 is a side elevational view of the instrument.

FIG. 3 is a plan view of the instrument.

Referring more in detail to the drawings, wherein like numerals refer to similar parts throughout the several figures:

Figures 1, 4:
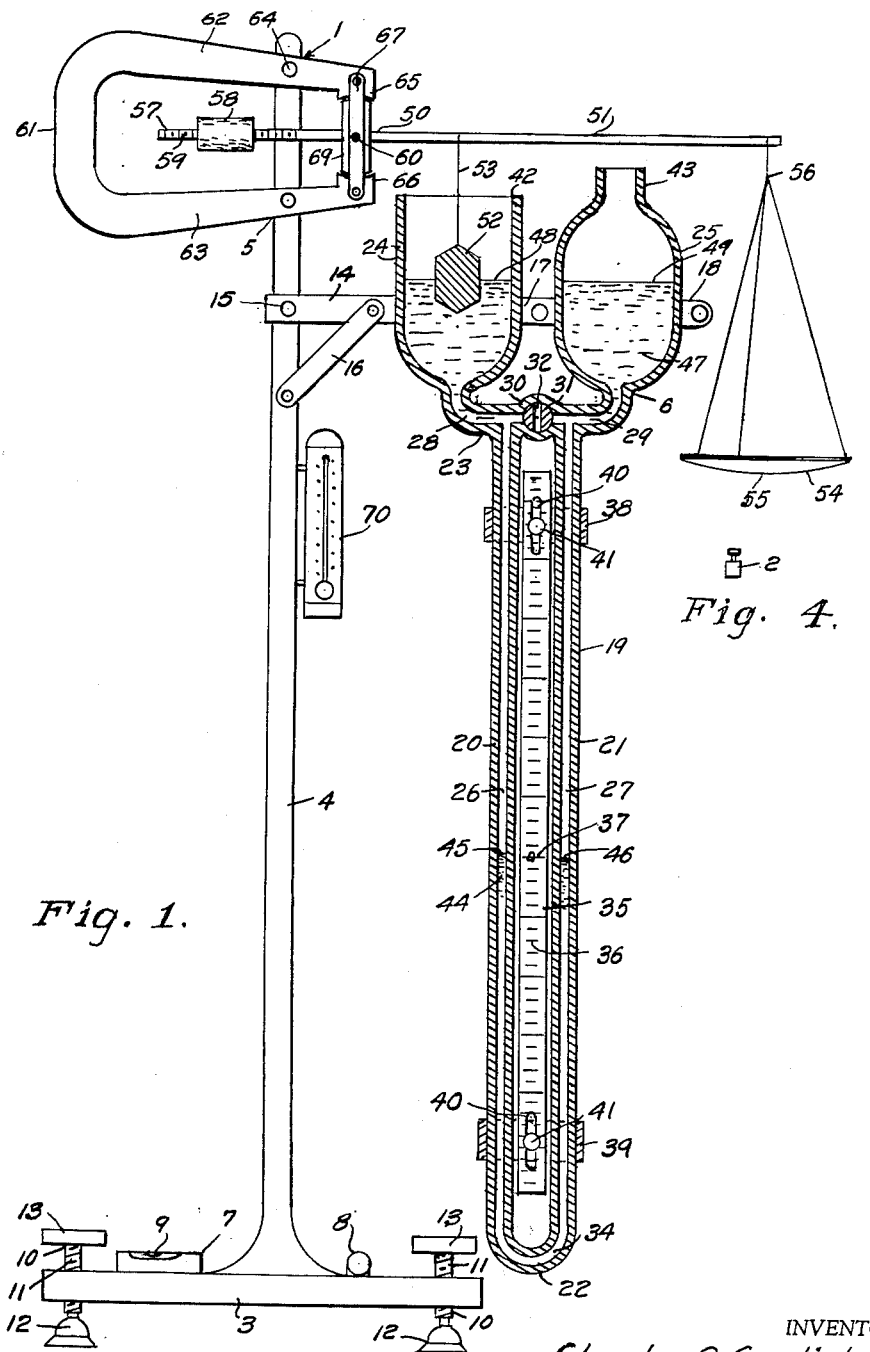
FIG. 1 is a front elevational view of an instrument constructed in accordance with the present invention, the manometer portion of the instrument being shown in vertical section to better illustrate the flow of liquids therein.
FIG. 4 is a side view of a weight element used in connection with the instrument.

1 designates an instrument constructed in accordance with the present invention for indicating and measuring minute variations in the force of gravity on a given body, such as a weight 2, illustrated in FIG. 4. The instrument includes a base 3 carrying a standard 4 for supporting a dynamometer 5 and a manometer 6 in cooperative relation. The base 3 is of ample size and area to support the standard 4 rigidly in perpendicular position.

The base 3 is provided with level indicators, designated 7 and 8 and having bubbles 9 for indicating the level of the base and perpendicularity of the standard 4, since the standard must be plumb for the mechanisms 5 and 6 to operate efficiently and properly. In order to plumb the standard at any given location, the base is provided with leveling screws 10 which have threaded shanks 11 rotatably threaded in the base and which carry feet 12 for engagement with any solid support. The adjusting screws 10 also have heads 13 by which the shanks may be turned into and out of the base to effect leveling thereof, as will be determined by the bubbles 9 of the level indicators 7 and 8.

The manometer 6 that is illustrated in the drawings is of the differential type and is supported from the standard 4 on an arm 14. The arm 14 is attached to the standard by a fastening device 15 and is suitably braced from the standard by a bracket 16. The outer end of the arm 14 carries clamping collars 17 and 18 for rigidly holding the manometer in perpendicular position and in fixed relation with respect to the dynamometer 5.

The manometer includes a U tube 19 having vertical tubular legs 20 and 21 connected at their lower ends by a U bend 22. The upper ends of the legs 20 and 21 are connected transversely thereof by a header 23 carrying at its respective ends reservoirs, cups or receptacles 24 and 25 and which connect, respectively, with the channels 26 and 27 of the legs through channels 28 and 29 in the header and which are adapted to be interconnected by a valve 30. The valve 30 is provided in the header intermediate the legs 20 and 21 and has a rotatable plug or core 31 provided with a diametrical port 32 that is adapted to be registered in the channels 28 and 29 in one position of the core, and to close the connection between the channels in another position of the core, as is shown in FIG. 1. The valve core 31 is operated by a turning knob 33 that is fixed to one end thereof, as shown in FIGS. 2 and 3. The U bend 22 has a channel 34 that connects the lower ends of the channels 26 and 27. A continuous passageway is therefore open between the receptacles by way of the legs 20 and 21 and also by a valved passage by way of the valve 30.

Carried in the space between the legs 20 and 21 is a scale 35 having graduations 36 above and below a zero marking 37. The scale 35 is adjustably supported at the ends on brackets 38 and 39 that are attached to the legs of the manometer. The ends of the scale have vertical slots 40 for passing clamp screws 41 that are threaded into the brackets to clamp the scale in adjusted position.

The reservoir or receptacle 24 has an open top 42, while the upper end of the reservoir 25 has an open neck 43. The vertical channels in the legs of the manometer are filled up to the zero mark with a liquid 44 to indicate levels 45 and 46 in the respective legs of the manometer. The portions of the channels above the levels 45 and 46 are filled with a nonmiscible liquid 47 of nearly the same specific gravity as the liquid 44. The liquid 47 extends up into the reservoirs 24 and 25 to establish surface levels 48 and 49 therein. While any two nonmiscible liquids having substantially the same specific gravity may be used, the most satisfactory liquids 44 and 47 are alcohol and kerosene, respectively. Commercial alcohol is only slightly heavier than kerosene and can be colored with a small tablet used for coloring cakes. Such color will readily color the alcohol but will not mix with the kerosene. Water and oil might also be used as the two liquids, but in freezing weather an antifreeze would have to be added to the water, and the oil might be too viscous to operate quickly.

The dynamometer includes a beam 50 having an arm 51 that extends across the open top of the reservoir 24 and carries a liquid displacing plug 52 that is partially submerged in the kerosene. The plug may be suspended from the arm of the beam by means of a strand 53 having one end attached to the plug and its other end to the arm of the beam. The outer end of the arm carries a pan 54 having a concave bottom 55 for containing the weight 2 therein, as later described. The pan is suspended from the beam by suitable strands 56 to maintain level of the pan substantially in the manner as the pan of a balancing scale. The beam 50 has an opposite arm 57 to carry a balance weight 58 that is adjustably mounted thereon, preferably by providing the arm with threads 59 for engaging an internally threaded bore of the weight, whereby the weight is adjusted to and from a fulcrum 60 of the beam to balance the weight on the other and longer arm 51.

With the structure thus far described, the weight 2 in the plan will rock the beam responsive to the pull of gravity thereon and to apply a counterforce to resist movement of the beam and to determine the amount of the pull I provide a permanent magnet 61 having arms 62 and 63 that also serve to mount the fulcrum 60. The arms of the magnet are positioned horizontally with the fulcrum 60 therebetween and the arms are fixed to the upper end of the standard 4 by fastening devices 64. The ends of the arms 62 and 63 terminate directly above and below the fulcrum in poles 65 and 66 which are interconnected by nonmagnetic plates 67 and 68 to carry the ends of the fulcrum 60 therebetween. Also carried on the arm in concentric relation with the fulcrum is an armature 69 which normally supports the beam in horizontal position responsive to attraction of the poles, but which yields to allow tipping of the beam responsive to gravity force acting on the weight that is placed in the plan, as later described.

If desired, the standard may be provided with a thermometer 70 to determine temperatures at which the readings are taken, as later described.

In using the instrument constructed as described, and assuming that the liquids 44 and 47 are in place with the levels 45 and 46 of the liquid 44 substantially in plane with the zero mark 37, and the levels 48 and 49 of the liquid 47 carried within the reservoirs, cups or receptacles 24 and 25, the base 3 is adjusted to level for plumbing the standard 4. This is readily effected by turning the heads 13 to adjust the screws 10 until the bubbles 9 of the level indicating devices 7 and 8 show that the base is level. When the base is level, the standard 4 is perpendicular.

The core 31 of the bypass valve 30 is then turned to register the port 32 with the channels 28 and 29. This allows the levels 48 and 49 of the liquid 47 to equalize and bring the levels 45 and 46 of the liquid 44 in registry with the zero mark 37 on the scale 36. The counterweight 58 is then adjusted to balance the beam 50 in horizontal position, which results in partial immersion of the displacement plug 52 within the liquid of the reservoir 24 and change in level of the liquid in the receptacle 24 will result in surfaces of the liquids in the receptacles seeking the same hydrostatic levels by way of the bypass port 32 of the valve. The equalizing valve is then closed. The weight 2 is placed in the pan 54, causing the plug 52 to descend within the liquid in the reservoir 24 corresponding to the attraction of gravity on the weight. Movement of the beam is restricted by the armature 69 to control the movement of the beam responsive to gravitational pull on the weight 2. Movement of the plug 52 displaces liquid 47 which tends for the hydrostatic head of liquid to rise in the receptacle 24, but since the legs 20 and 21 are connected by the U bend 22, liquid will flow in the direction of the receptacle until the levels 48 and 49 equalize. This movement of the liquid causes the level 45 of the colored liquid 44 to move downwardly in the leg 20 and the level 46 to move upwardly in the leg 21, substantially greater distances than the change in the levels 48 and 49 which result by the force of gravity acting upon the weight as influenced by the underlying formation. Consequently, the force of gravity acting on the weight may be read on the scale in a magnified or amplified degree, the degree of magnification being dependent on the ratio of surface area in the reservoir cup 24 of the manometer to that of the cross sectional area of the channel in the legs 20 and 21.

It is, therefore, apparent that the force of gravity acting on the weight may be easily and accurately determined by noting the relative positions of the levels 45 and 46 on the manometer scale 36. When the reading of the gravity force is taken and recorded at the location of setting up the instrument, the instrument is moved to other locations over a likely area and other readings taken at each location in a like manner, until the spot is found where the force of gravity is found to be the greatest. At this point the instrument is located directly over an underlying dome, where minerals such as petroleum and the like may be entrapped.

From the foregoing, it is obvious that I have provided an instrument embodying the functions of a dynamometer for dynamometrically sensing the gravity pull on a weight and a manometer whereby the action of the dynamometer may be substantially magnified manometrically to obtain an accurate reading of the force of gravity at various locations of an area to be surveyed for locating subsurface formations.

What I claim and desire to secure by Letters Patent is:

1. An instrument for locating subsurface domes from a point above the earth's surface, including a base, a perpendicular standard on the base, a magnet having support on the standard and having spaced apart poles, an armature, means for oscillatably supporting the armature between said poles of the magnet, a beam oscillatable with the armature, a support suspended from said beam for carrying a weight to effect movement of the beam under resistance of the magnet, a liquid displacement member suspended from said beam, means on the beam for balancing the beam in horizontal position, a weight adapted to be attracted by subsurface bodies to effect movement of the beam responsive to said attraction, a manometer supported by said standard and having laterally spaced receptacles, with one of said receptacles in position to contain the displacement member therein, a U tube depending from the bottom of the receptacles and having a flow channel of substantialy smaller diameter for containing an indicating liquid adapted to oscillate in said channels of the legs, and a nonmiscible liquid contained in the receptacles and filling the channels of the legs above the indicating liquid, said nonmiscible liquid being adapted to be displaced by said displacement member to cause movement of the liquid toward the other receptacle to equalize levels in the receptacles for causing movement of the indicating liquid to indicate a high amplification of movement of the beam.

2. An instrument for locating subsurface domes from a point above the earth's surface, including a base, a perpendicular standard on the base, a magnet having support on the standard, a beam oscillatable on the standard, a support suspended from said beam for carrying a weight to effect movement of the beam, a liquid displacement member suspended from said beam, means on the beam for balancing the beam in horizontal position, means for yieldingly retaining the beam in balanced position, a weight adapted to be attracted by subsurface bodies to effect movement of the beam responsive to said attraction, a manometer supported by said standard and having laterally spaced receptacles, with one of said receptacles in position to contain the displacement member therein, a U tube depending from the bottom of the receptacles and having a flow channel of substantially smaller diameter for containing an indicating liquid adapted to oscillate in said channels of the legs, a nonmiscible liquid contained in the receptacles and filling the channels of the legs above the indicating liquid, said nonmiscible liquid being adapted to be displaced by said displacement member to cause movement of the liquid toward the other receptacle to equalize levels in the receptacles for causing movement of the indicating liquid to indicate a high amplification of movement of the beam, and a valved bypass connecting the legs of the manometer above the levels of the indicating liquid to equalize the levels of said liquids when the beam is brought to an initial balance preparatory to use of the instrument.

3. An instrument for locating subsurface domes from a point above the earth's surface, including a base, a perpendicular standard on the base, a magnet having support on the standard and having spaced apart poles, an armature, means for oscillatably supporting the armature between said poles of the magnet, a beam oscillatable with the armature, a support suspended from said beam for carrying a weight to effect movement of the beam under resistance of the magnet, a liquid displacement member suspended from said beam, means on the beam for balancing the beam in horizontal position, a weight adapted to be attracted by subsurface bodies to effect movement of the beam responsive to said attraction, a manometer supported by said standard and having laterally spaced receptacles, with one of said receptacles in position to contain the displacement member therein, a U tube depending from the bottom of the receptacles and having a flow channel of substantially smaller diameter for containing an indicating liquid adapted to oscillate in said channels of the legs, a nonmiscible liquid contained in the receptacles and filling the channels of the legs above the indicating liquid, said nonmiscible liquid being adapted to be displaced by said displacement member to cause movement of the liquid toward the other receptacle to equalize levels in the receptacles for causing movement of the indicating liquid to indicate a high amplification of movement of the beam, and a valved bypass connecting the legs of the manometer above the levels of the indicating liquid to equalize the levels of said liquids when the bypass is opened.

4. An instrument for locating subsurface domes from a point above the earth's surface, including a base, a standard on the base, a beam, a pivot on the standard for bodily supporting the beam intermediate the ends thereof, a support suspended from one end of the beam for carrying a weight, a liquid displacement member suspended from the beam at a point intermediate the pivot and the weight support, means on the other end of the beam for balancing the beam in horizontal position, means nonresponsive to gravity for yieldingly resisting oscillation of the beam, laterally spaced receptacles on the standard with one of said receptacles in position to contain the displacement member therein, a U-tube having legs thereof respectively depending from the receptacles and having a flow channel of substantially smaller diameter than the receptacles, a scale extending along said legs, an indicating liquid in said U-tube and adapted to oscillate to and from a zero index on the scale, a nonmiscible liquid having substantially the same specific gravity as the indicating liquid and having a characteristic capable of being distinguished from the indicating liquid in said receptacles for filling the channel of the legs above the indicating liquid and to supply a liquid in said receptacles for movement from one receptacle toward the other responsive to the movement of said displacement member upon pivoting of the beam, and a weight for placement upon the weight support for attraction by subsurface bodies to pivot the beam for causing the displacement member to move the nonmiscible liquid displaced by the displacement member toward the other of said receptacles through an amplified movement of the indicating liquid in said tube by way of said legs of the U-tube when said valve is closed for amplification of movement of the liquid displaced responsive to the gravity attraction on said weight.

5. An instrument for locating subsurface domes from a point above the earth's surface, including a base, a standard on the base, a beam oscillatable on the standard, a support suspended from the beam for carrying a weight, a liquid displacement member suspended from the beam, means on the beam for balancing the beam in horizontal position, means nonresponsive to gravity for yieldingly resisting oscillation of the beam, laterally spaced receptacles on the standard with one of said receptacles in position to contain the displacement member therein, a U-tube having legs thereof respectively depending from the receptacles and having a flow channel of substantially smaller diameter than the receptacles, a scale extending along said legs, an indicating liquid in said U-tube and adapted to oscillate from a zero index on the scale, a nonmiscible liquid having substantially the same specific gravity as the indicating liquid and having a characteristic capable of being distinguished from the indicating liquid in said receptacles for filling the channel of the legs above the indicating liquid and to supply a liquid in said receptacles for movement from one receptacle toward the other responsive to the displacement of said displacement member, a valved connection between said receptacles for equalizing the levels of said nonmiscible liquid in the receptacles to balance the indicating liquid with respect to said zero index when the valve in said connection is open, and a weight for placement upon the weight support for attraction by subsurface bodies to effect movement of the beam and to cause the displacement member to effect movement of said liquids by way of said legs of the U-tube when said valve is closed for amplification of movement of the liquid displaced responsive to the gravity attraction on said weight.

6. An instrument for locating subsurface domes from a point above the earth's surface, including a base, a standard on the base, a beam oscillatable on the standard, a support suspended from the beam for carrying a weight, a liquid displacement member suspended from the beam, means on the beam for balancing the beam in horizontal position, means nonresponsive to gravity for yieldingly resisting oscillation of the beam, laterally spaced receptacles on the standard with one of said receptacles in position to contain the displacement member therein, a U-tube having legs thereof respectively depending from the receptacles and having a flow chanel of substantially smaller diameter than the receptacles, a scale extending along said legs, an indicating liquid in said U-tube and adapted to oscillate from a zero index on the scale, a nonmiscible liquid having a characteristic capable of being distinguished from the indicating liquid and contained in the receptacles for filling the channel of the legs above the indicating liquid and to supply a liquid in said receptacles for movement from one receptacle toward the other responsive to movement of said displacement member, a valved connection between said receptacles for equalizing the levels of said nonmiscible liquid in the receptacles to balance the indicating liquid with respect to said zero index when the valve in said connection is open, and a weight for placement upon the weight support for attraction by subsurface bodies to effect movement of the beam and cause the displacement member to effect movement of said liquids by way of said legs of the U-tube when said valve is closed for amplification of movement of the liquid displaced responsive to the gravity attraction on said weight.

References Cited in the file of this patent

UNITED STATES PATENTS

| 1,524,928 | Hardel et al. | Feb. 3, 1925 |
| 2,055,479 | Bryan | Sept. 29, 1936 |
| 2,117,471 | Evjen | May 17, 1938 |
| 2,243,747 | Clewell | May 27, 1941 |

FOREIGN PATENTS

| 650,566 | Germany | Feb. 28, 1938 |
| 97,916 | Sweden | Jan. 30, 1940 |